United States Patent [19]
Batterham et al.

[11] Patent Number: 5,364,446
[45] Date of Patent: Nov. 15, 1994

[54] HEATING AND TREATMENT OF PARTICULATE MATERIAL

[75] Inventors: Robin J. Batterham, Sandringham; Roderick M. Grant, Doncaster; James V. Happ, Ringwood; Glenn A. Thiele, Box Hill North, all of Australia

[73] Assignee: CRA Services Ltd., Australia

[21] Appl. No.: 847,075

[22] PCT Filed: Aug. 3, 1990

[86] PCT No.: PCT/AU90/00330
§ 371 Date: Apr. 8, 1992
§ 102(e) Date: Apr. 8, 1992

[87] PCT Pub. No.: WO91/01799
PCT Pub. Date: Feb. 21, 1991

[30] Foreign Application Priority Data
Aug. 9, 1989 [AU] Australia .................. PJ5700

[51] Int. Cl.$^5$ .................. B01J 6/00; C04B 2/10
[52] U.S. Cl. .................. 75/434; 75/746; 75/764
[58] Field of Search .................. 75/764, 434, 746

[56] References Cited
U.S. PATENT DOCUMENTS
Re. 30,060  7/1979  Kreiger ............... 75/764
3,753,683   8/1973  Vlnaty ............... 75/764

OTHER PUBLICATIONS
English Translation of German Patent No. 25.515 IVa/12 g, CRA Services Ltd., by Eng. Otto Heinemann, Filed Aug. 12, 1960, "Device for the Combustion, calcination and Sintering of Pulverized or Granulated Product in Suspension, and Procedure for the Operation of this Device".

Primary Examiner—Peter D. Rosenberg
Attorney, Agent, or Firm—Larson and Taylor

[57] ABSTRACT

The specification discloses a process for heating solid particulate materials. The process comprises entraining the solid particulate materials in a gas to form a stream of gas containing entrained particles and containing this stream with a stream of hot gases. The contact between the two streams is performed in such a manner that at least a portion of the solid particulate material is heated rapidly and the heated and unheated particles enter flow patterns in which contact between the particles and with interior surfaces of contact chamber is minimized. A heating and treatment chamber for applying the process to the treatment of solid particulate materials is disclosed. The specification also discloses a molten bath reactor combined with the chamber for heating and treating solid particulate materials. Hot off gases from the molten bath reactor can be passed through the chamber and treated particulate material from the chamber can be inserted in the molten bath reactor or partially recycled through the chamber.

24 Claims, 4 Drawing Sheets

HEATING AND TREATMENT OF PARTICULATE MATERIAL

FIELD OF THE INVENTION

This invention relates to the heating and treatment of solid particulate materials utilising a stream of hot gas, for example, the off-gas from a molten bath reactor.

Carbonate materials such as limestone may be treated according to this invention and subsequently added to an iron-ore derived slag in the molten bath reactor, so as to make a Portland-type cement. Alternatively, the lo treated carbonate materials may be subsequently added to, for example, a direct iron-making molten bath reactor, a ferroalloy molten bath reactor, or a non-ferrous molten bath reactor.

BACKGROUND OF THE INVENTION

The process for the production of a Portland-type cement from blast furnace slag in a molten bath reactor requires additions of calcium carbonate or calcium oxide to the slag.

An object of this invention is to minimise the requirement for additional energy for calcination by utilizing the energy of the hot off-gases that leave the molten bath reactor.

Calcination of, for example, limestone, is performed in a variety of furnaces: vertical shaft kilns, rotary kilns, rotary hearth kilns, twin and multiple shaft regenerative kilns, fluidised beds and entrained flow reactors.

Vertical shaft kilns produce a lower quality of lime compared with other types of kilns, and can only accept feed of no less than about 50 mm in size. Smaller sized feed results in a packed bed of insufficient porosity. Nevertheless, the vertical shaft kiln is a very energy efficient kiln.

Rotary kilns are generally able to accept almost any sized feed, down to about 1 mm in size. However, to obtain good energy efficiency it is necessary to incorporate preheaters in combination with the kilns. This combination suffers from twin disadvantages of having high capital and maintenance costs.

Twin and multiple shaft regenerative kilns offer good energy efficiency, since the waste gas from the calcining kiln is used to preheat other kilns. This sequence is continued around the kilns—successively preheating then calcining in each kiln. However, this type of kiln is not suitable for treating fine sized materials.

Fluidised bed calciners are generally able to treat finer sized materials than shaft furnaces. However, control of particle size distribution is important, and large quantities of hot pressurised gas are needed for the fluidisation.

Unfortunately, non of these processes can be adapted so that the hot off-gases from a molten bath reactor, which usually contain sticky and/or molten material, can be used as the energy source of calcination.

In U.S. Pat. No. 3,022,989 (Union Commerce Bank) a process for manufacturing hydraulic cements is disclosed. In this process there is a fluidised bed of particles, in which gases are combusted. A certain amount of stickiness of particles results, but the degree of stickiness is controlled so as to be insufficient to cause large particles to become attached to one another, and agglomeration of the fluidised mass is thereby prevented.

Unfortunately this process requires a fuel to be combusted to provide the high temperatures. It is unlikely that hot off-gases from a molten bath reactor, which contain sticky grains and/or molten droplets could be used to provide the high temperatures. The process operates at a high solids loading, and as a consequence requires that there be a large pressure drop as gases flow through the bed. Furthermore, by virtue of the well-mixed nature of fluidised beds it is not possible to have very large differences between the temperatures of the hottest and coldest particles in the bed.

In patent application No. P251515 IVa/12g in the Federal Republic of Germany by Polysius GmbH, an apparatus is disclosed for the combustion, calcination and sintering of a pulverized or granulated product in suspension, and to the operating procedure for such an apparatus. The apparatus seems to be a modified cyclone with a flattened or 'pancake' cross-section.

The drawings in the Polysius specification are confusing and seem to contradict the specification, since the paths of the treatment gas, the pulverized or granulated material to be treated and the carburant are drawn in a haphazard manner. The best conclusion seems to be that entrainment of the material to be treated is transitory only, the treated material being separated almost immediately from the treatment gas.

No attempt seems to be made to minimise contact of the particles with each other, with a consequent danger of agglomeration. In addition, the particles travel to the wall of the treatment chamber for removal, with a danger in this case of accretion to the wall.

Furthermore, the pulverized or granulated material seems to be injected counterflow to the air. In addition carburant is burned in the relatively small space where the particles and gas are travelling counterflow. This must lead to severe turbulence, with particles contacting each other and the wall of the treatment chamber.

Finally, the apparatus and process of Polysius do not make use of the sensible heat from off-gases, rather heat must be supplied by burning fuel.

BRIEF SUMMARY OF THE INVENTION

This invention depends on the observation that, if particles of a solid which are entrained in a gas are exposed to higher temperatures than achieved in the prior art, desirable effects can be obtained, for example, calcination and/or raising the temperature of the bulk of the particles of solid. Since the particles are heated to higher temperatures, chemical reactions proceed more rapidly, and so the particles need be raised to these higher temperatures for short durations only.

Accordingly the present invention provides a process for heating a solid non-reducible particulate material which process comprises forming a stream of the solid non-reducible particulate material and a hot gas containing sticky particulate material, wherein the hot gas has a temperature in excess of that at which the sticky particulate material contained in the hot gas exhibits sticky characteristics.

The non-reducible particulate material comprises particles of a material which is not reducible by heating with the hot gas even if the hot gas has a reductive capacity, e.g. an off-gas containing carbon monoxide and possibly hydrogen.

The process of the invention may be used to preheat and at least partially calcine a carbonate prior to addition as a flux to a molten iron bath. Similarly the process of the invention may be used to preheat other fluxes such as similar prior to their addition to a molten iron bath.

The sticky particles referred to herein are particles that exhibit sticky characteristics at an elevated temperature range. They may comprise molten droplets of metal or partially molten particles of ore in circumstances which the hot gas is an off gas from a molten bath reactor.

It is preferred that the temperature of the bulk of the particulate material substantially equilibrates prior to leaving the chamber. By this means, the particles have been cooled to below their sticky temperature before they leave the chamber.

An important embodiment of this invention is basically an entrainment process in which the bulk of the particulate material being treated in the chamber is transported through the chamber by means of entrainment in gas. It is surmised that a region of convention bubbling bed fluidisation is unnecessary and that the particulate material need not remain in the chamber for a substantial length of time, although the heated material may be passed through the chamber one or more times.

The present invention develops further the inventions described in International Patent Application No. PCT/AU90/00232 "Pre-heating and pre-reduction of metal oxide ore using high temperature off-gasses" and International Patent Application No. PCT/AU90/00233 "Manufacture of ferrochrome by [means of] a molten bath reactor" both in the name of the present applicant.

The process of the present invention may be used to heat and calcine at least partially, finely, divided carbonate materials, such as limestone, magnesite, dolomite or mixtures of these materials. The bulk of such materials can be heated to a relatively high temperature ready for addition to a chemical or metallurgical process or for further treatment, for example, further calcination.

The hot gas may be obtained from any suitable source but is conveniently off-gas from a molten bath reactor. Where off-gas is used, the process performed the function of heating the particulate material and quenching the off-gas. Off-gases normally contain sticky or molten particles. The sticky or molten particles can create serious problems when they adhere to duct and chamber surfaces. Accordingly the presence of these particles has made utilisation of the heat energy of high temperature off-gases very difficult.

Any sticky or molten substance entrained in the off-gas may adhere to the particulate material being heated. In many cases the presence of a certain amount of this adhering substance is quite acceptable.

The present invention largely overcomes the problem of stickiness, adherence and agglomeration. Thus, hot molten bath reactor off-gases containing sticky or molten particles are conveyed from the molten bath reactor to the chamber in a duct. There is no requirement that contact of particles with the interior surface of the duct be minimised. Rather, the accumulation of deposits on the interior surface of the duct is minimised by maintaining the duct surface at a sufficiently high temperature. This effect is assisted by the velocity of the off-gas and, preferably, by the inclination of the duct.

It is only after hot molten bath reactor off-gases containing sticky or molten particles enter the chamber that contact must be minimised between particles and the interior surface of the chamber. The transition from the sticky of molten stage to the non-sticky or solidified stage respectfully will largely occur within the chamber. This may be achieved by quenching the particles before they reach the interior walls of the chamber, by establishing flow patterns within the chamber that minimise inter-particle collisions and contact with the interior walls of the chamber or a combination of both rapid quenching and establishing suitable flow patterns.

A chamber suitable for this purpose comprises a vessel adapted to confine and direct a stream of non-reducible particulate material and a hot gas containing sticky particulate material and living a temperature in excess of that at which the sticky particulate material contained therein exhibits sticky characteristics;

first inlet means for introducing the hot gas into the vessel;

second inlet means for introducing into the vessel a stream of solid non-reducible particulate material entrained in a carrier gas; and wherein the first and second inlet means and the outlet means are so located with respect to each other and the vessel is so shaped and sized that the solid non-reducible particulate material is initially heated and subsequently quenched prior to the stream leaving the vessel and the first inlet means and the vessel have cross-sectional areas that are so sized that the solid non-reducible particulate material enters flow patterns in which inter-particle contact and contact with vessel walls are minimized.

Preferably the chamber is elongate in the direction of flow, the inlet means are located at a first end, the outlet means at a second end and the chamber arranged vertically.

Preferably also the first inlet means is much narrower in cross-section then the chamber and the chamber tapers inwardly towards the outlet means which is also of much narrower cross-section than the chamber. In this way the stream is caused to slow progressively as it slows from the first end towards the second end and then speed up as it approaches the second end.

When the particles reach the outlet means, they have been cooled to a temperature below the sticky temperature. Hence there is no longer any need to minimise contact between particles and duct or equipment surfaces so that established gas/solids handling procedures can be employed.

The invention also provides apparatus for production of a molten product which apparatus comprises, a chamber as herein before described;

means for passing off-gas from the molten bath reactor to the chamber and means for passing heated solid non-reducible particulate material from the chamber to the molten bath reactor.

This invention offers the following advantages:

1) A proportion of the particulate material fed to the chamber may be heated to a very high temperature. For example, in the case of particulate limestone, calcination occurs rapidly at these high temperatures.

2) Loss of particle integrity and accretion to internal surfaces are limited.

3) Retention of finely divided size in the treated particulate material assists subsequent processing.

4) Use can be made of the sensible heat of off-gases despite the presence of sticky or molten particles, reducing overall energy requirements. In convention processes, where such particles are present, recovery of heat is very difficult.

BRIEF DESCRIPTION OF THE DRAWINGS

The embodiments shown in the accompanying figures are for illustrative purposes only. The configuration and positioning of the inlets and outlets may be varied as necessary to obtain the desired results as set out above.

In the accompanying drawings.

DETAILED DESCRIPTION OF THE INVENTION

Figure 1:
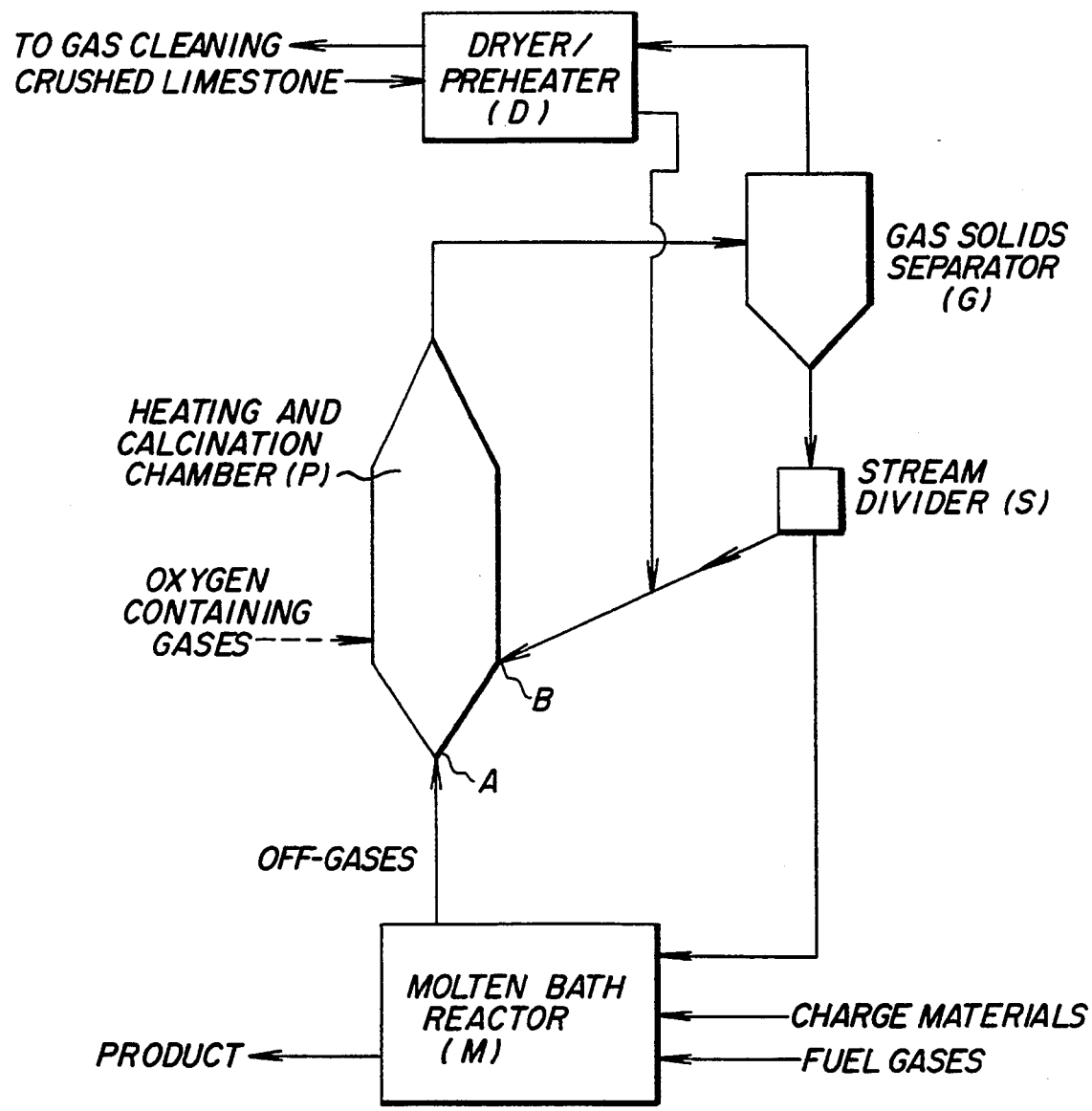
FIG. 1 illustrates one embodiment of the invention described with reference to heating and treatment of particulate carbonate material, such as limestone. Off-gases from a molten bath reactor pass to a heating and calcination chamber. Fresh carbonate material is also passed to this chamber and from there to a separating chamber, where the solids and gases are separated. The treated carbonate material stream is then split into two parts (these parts not necessarily being equal parts). One part is recirculated to the chamber, whilst the other part is added to the molten bath reactor.

This invention will be described with particular reference to heating and calcining limestone but it can be applied to a range of particulate materials, for example, other carbonate minerals. Certain carbonate-containing minerals contain more than one carbonate. For example, dolomite contains both calcium and magnesium carbonates. Calcination of either or both carbonates is an advantage. It is recognised that calcining may not result in calcination of all of the carbonates or carbonate components.

The invention may be used in conjunction with any reactor which produces off-gases at elevated temperature optionally with reducing potential. It may be used for provision of calcined material as a flux added to a molten bath reactor so that a slag of desired composition is obtained. Thus it is of particular use in conjunction with a molten bath reactor, for example, a molten bath reactor used to produce a Portland-type cement from an iron ore-derived slag.

The invention, in one embodiment, utilises some of the sensible heat (and, optionally, some of the chemical energy) derived from a pyrometallurgical reactor off-gas, to heat and calcine carbonate materials. These particles of carbonate may be heated to a very high temperature to obtain enhanced rates of calcination of the carbonate.

Even if the temperatures employed are lower than the very high temperatures possible, the process according to the invention provides an improvement over the prior art by reducing contact of the particles in the stream of gas with each other and also with interior surfaces. The invention also enables the treatment of fine materials, and materials that are prone to breaking due to their weak nature thus forming fine materials.

Whilst this invention has special advantages when the reactor off-gas being used contains sticky or molten particles, this invention may also be used in cases where the reactor off-gas is free from sticky grains or molten droplets.

The cross-sectional area of the chamber is desirably substantially greater than the corresponding cross-sectional area of the orifice(s) so that suitable flow patterns are set up that minimise direct contact of the particles with the walls of the chamber and with each other.

As the stream of carbonate material and hot off-gas flows from the inlet orifice toward the outlet port it slows progressively as a result of the increase in cross-sectional area from the orifice to the chamber. However, as the stream approaches the outlet port and the cross-sectional area of the chamber decreases, the velocity of the stream increases. In this way incoming particles of carbonate are initially entrained and those in the off-gas remain entrained in the higher velocity entrance stream. However as the stream slows as it moves towards the outlet some of the particles diverge from the stream and fall back towards the inlet end. Whether or not a particle will remain entrained depends upon a number of factors including its density, size, surface area and its position in the stream. Particles remaining entrained in the stream cool below the sticky temperature of the sticky particles before reaching the outlet and particles which fall towards the inlet end of the chamber also cool below the sticky temperature of sticky particles before becoming entrained again in the higher velocity inlet stream of hot gas.

The shape of the or each orifice and of the or each entry port is selected to provide smooth, rounded interior surfaces within the minimum of dead space to reduce or eliminate agglomeration of particles from the molten bath reactor around the port.

The carbonate material particles, for example, are desirably introduced in to the chamber at a point or points in close proximity to the point of entry of the off-gases. The carbonate material particles may originate from bulk storage or from another chamber operated in conjunction with the first-mentioned chamber. The particles are transported to the chamber by any suitable gas, for example, off-gas which has been completely oxidised.

Contact between hot carbonate particles may be minimised by varing the relative proportions of hot gas and carbonate material. Usually the quantity of gas avaiable is 'given' and is dependent upon the operation of the furnace, for example. Thus the feed rate of particulate material is matched to the flow of gas to avoid, so far as possible, undesirable collision between carbonate material particles and to control the target temperature within the chamber.

By the time the particles leave the heating and calcination chamber they are at an essentially uniform temperature. This temperature is sufficiently low as allow the particles to be handled subsequently in conventional equipment.

The chamber may be fitted with an expanded riser or offtake flue to conduct the exit gases and, in this case, the particles will cool further.

It may be desirable in certain circumstances to provide external cooling to either or both of the chamber and the riser, for example, to cool the product and recover energy therefrom. Conversely, it may be desirable to provide insulation to obtain the greatest achievable heat recovery, for example, by the use of suitable refractory material.

Once the particles have cooled within the chamber to the desired temperature they may be withdrawn from the chamber and passed to further processing, for example, in a cyclone.

The residence time of the particles in the region of elevated temperature may be controlled by adjusting flow rate(s) of one or both of the molten bath off-gases and the carrier gas.

It should be noted that the particles may be passed once through the chamber or more than once, as required.

Use can be made of chemical energy of the off-gases by introducing an oxygen-containing gas into the off-gas, so as to burn any combustible species in the gas.

In one embodiment of this invention, all of the carbonate material used by the process is treated in the heater/calciner described in this invention. The heated and substantially calcined material is then fed into the molten bath reactor.

In another embodiment of this invention, the molten bath reactor process requirements for calcined material exceed the quantity that can be calcined in the heater/calciner described in this invention. In such circumstances the additional carbonate material may be injected in an uncalcined form directly into the molten bath reactor. Alternatively part or all of the additional carbonate material may be calcined in an established industrial calcination process (for example, rotary kiln, shaft kiln, fluidised bed, spouting bed calciner) before being fed into the molten bath reactor.

In another embodiment of this invention a falling curtain of cooler particulate material is maintained adjacent to the chamber interior surfaces. It is surmised that this curtain ensures that the only particles that contact interior surfaces are those which are sufficiently cool as to be below their sticking temperature. Sticky grains or molten droplets from either the molten bath reactor off-gas or from the material to be treated that would otherwise, because of their trajectories, contact and adhere to interior surfaces, are instead contacted and attached to particles in the falling curtain. By this means it is possible to avoid the build-up of accretions on chamber interior surfaces. Particles in the falling curtain and any attached material are entrained in the bulk flow of off-gas through the chamber and leave the chamber as part of the gas and solids exit stream.

It is preferred that further use be made of the molten bath reactor off-gases after they have passed through the heater/treatment chamber and have been separated from the particles in the gas-solids separator. It is preferred that this gas be used to dry and preheat crushed limestone feed (for example, in a rotary kiln or fluidised bed). The dried and preheated limestone feed may then be introduced to the heater/calcination circuit, to the molten bath reactor or to some other calcination device.

The invention may also be used in the direct production of iron from iron ore or ferroalloy from the appropriate feed ores using the appropriate particulate material to obtain the derived slag.

In the specification the term 'sticking temperature' is meant to include the case where stickiness is initiated over a temperature range and the adjective 'sticky' indicates that particles are at temperatures within that range.

In the specification the term 'oxygen-containing gas' refers to pure oxygen and gas containing oxygen, including air and oxygen-enriched air.

In the specification the term 'carbonaceous material' refers to any carbon-based material which can be burned to produce a suitably high temperature and includes: anthracite, bituminous or sub-bituminous coal, coking or steaming coal, coke, lignite or brown coal, lignite or brown coal-derived char, heavy petroleum residues and natural gas. The lignite or brown coal may have been densified using the process disclosed in Australian patent no. 561586 and applications no. 5259086 and 52422/86. A process for preparing a char from such a densified product is disclosed in Australian patent application No. 52234/86.

In the specification the molten bath reactor from which the hot off-gases are supplied may, for example, be any of the following: molten iron bath reactor, deep slag process reactor, ferroalloy bath reactor, non-ferrous bath reactor, or any other pyrometallurgical process bath reactor that discharges hot off-gases.

In the specification the hot off-gases from the molten bath reactor may contain any of the following, for example:

droplets of molten matte or metal or slag ejected from the molten bath reactor due to top or bottom blowing or stirring;

droplets of slag containing coke or coal particles from injection or charging of coke or coal, and grains of coke, coal, flux, ore or concentrate charged to the molten bath reactor but entrained directly into the off-gas.

A more detailed consideration of the use of off-gases from, for example, a molten bath reactor is now provided with reference to the accompanying drawings. These off-gases may contain a relatively high concentration of carbon monoxide and hydrogen. The exit temperature of these gases from the molten bath reactor may range from 1100° to 1800° C.

These off-gases are passed to a heating and treatment chamber P as shown in FIG. 1, where they exit from orifice A into the chamber. Orifice A is located upstream from ports B through which are passed fresh feed in a carrier gas. The spatial relationship of orifice A to ports B and the internal dimensions of chamber P are chosen to promote rapid heating of some of the, for example, carbonate particles in the general region near ports B, followed by cooling as the particles penetrate further into the chamber. The geometry and spatial relationship of orifice A and ports B and their spatial relationship are chosen also to reduce contact of the particles with the walls of the chamber, reducing or preventing build-up on the walls.

Entrained solids are passed to gas solids separator G, the still relatively hot gas being then used in a dryer/preheater D. The treated solids from G are then passed to a stream divider S. Part of the treated solids may be recycled to chamber P and part may be fed to molten bath reactor M.

Figure 2:
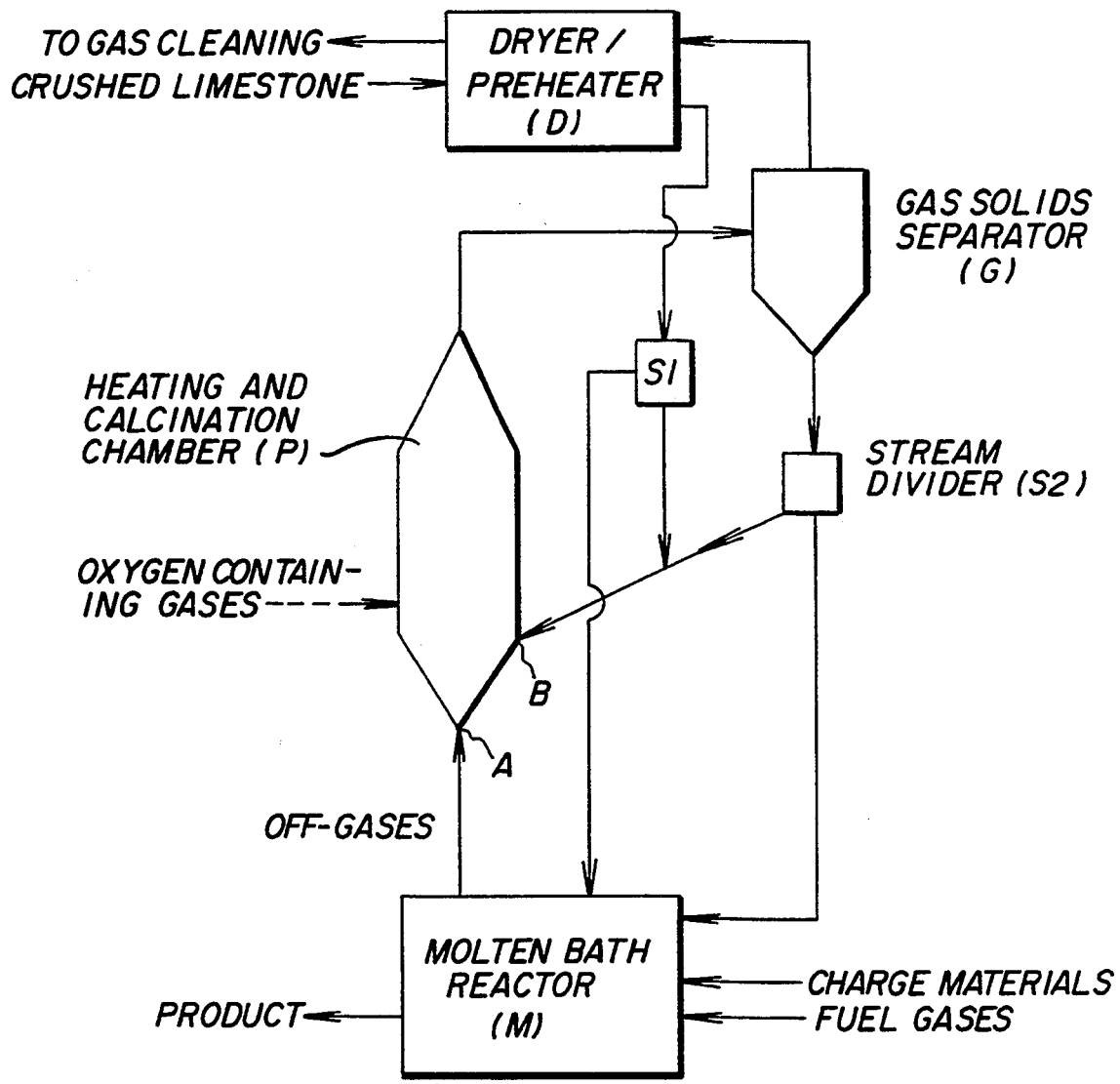
FIG. 2 illustrates another embodiment of the invention which features part of the limestone being fed to the molten bath reactor without prior calcination.

Fresh feed is added to chamber P from dryer/preheater D. Referring to FIG. 2, part of the fresh feed may be passed directly to molten bath reactor M from a second stream divider S2 (the first stream divider being designated S1 in this case).

Figure 3:
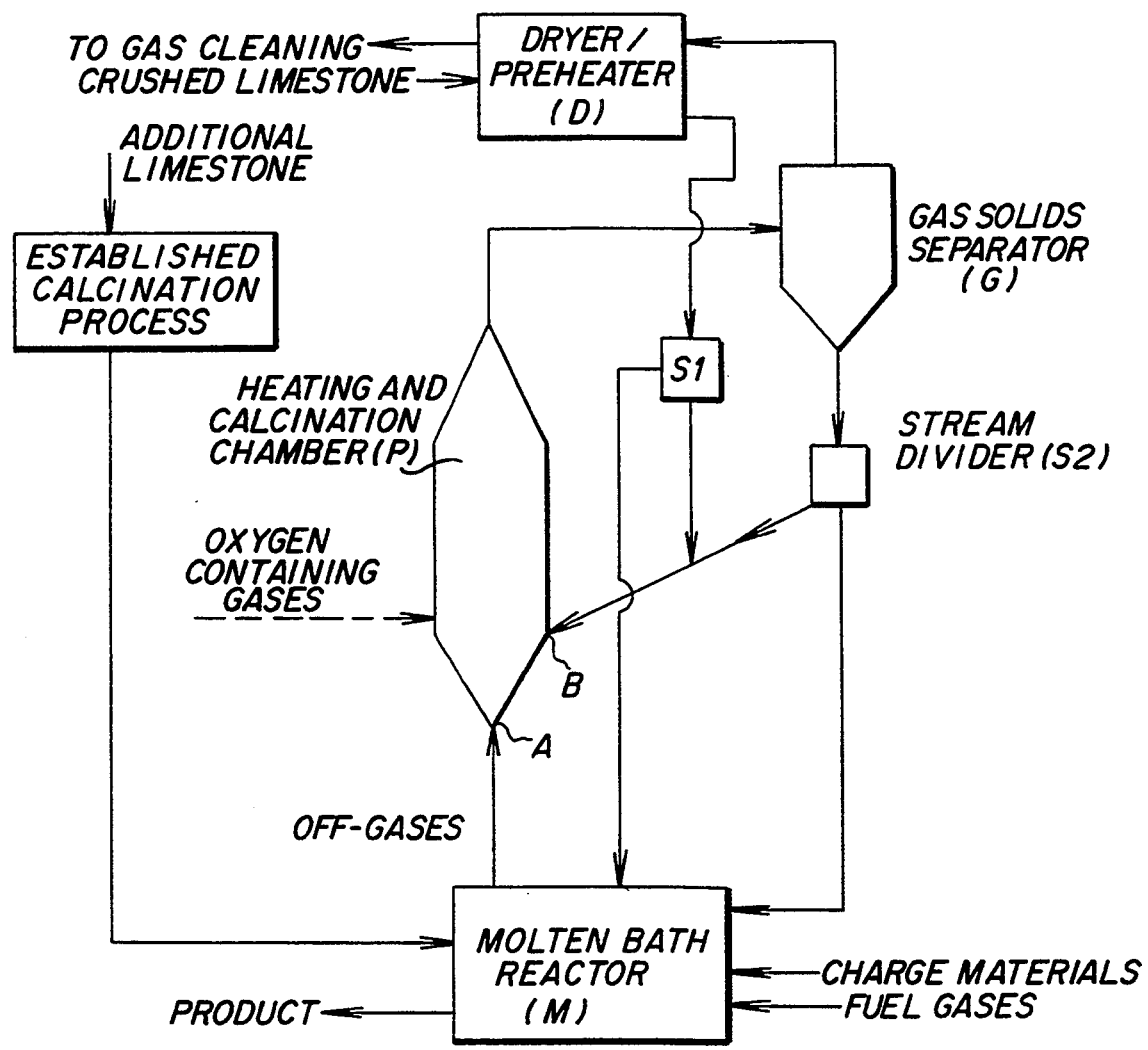
FIG. 3 illustrates another embodiment of the invention, which features some calcination of the limestone in the hot off-gases, some charging of uncalcined limestone directly into the molten bath reactor, and calcination of some additional limestone in an established calcination process.

Referring to FIG. 3, the additional element in this embodiment is the use of an established calcination process to provide part of the calcined feed to molten bath reactor M.

Figure 4:
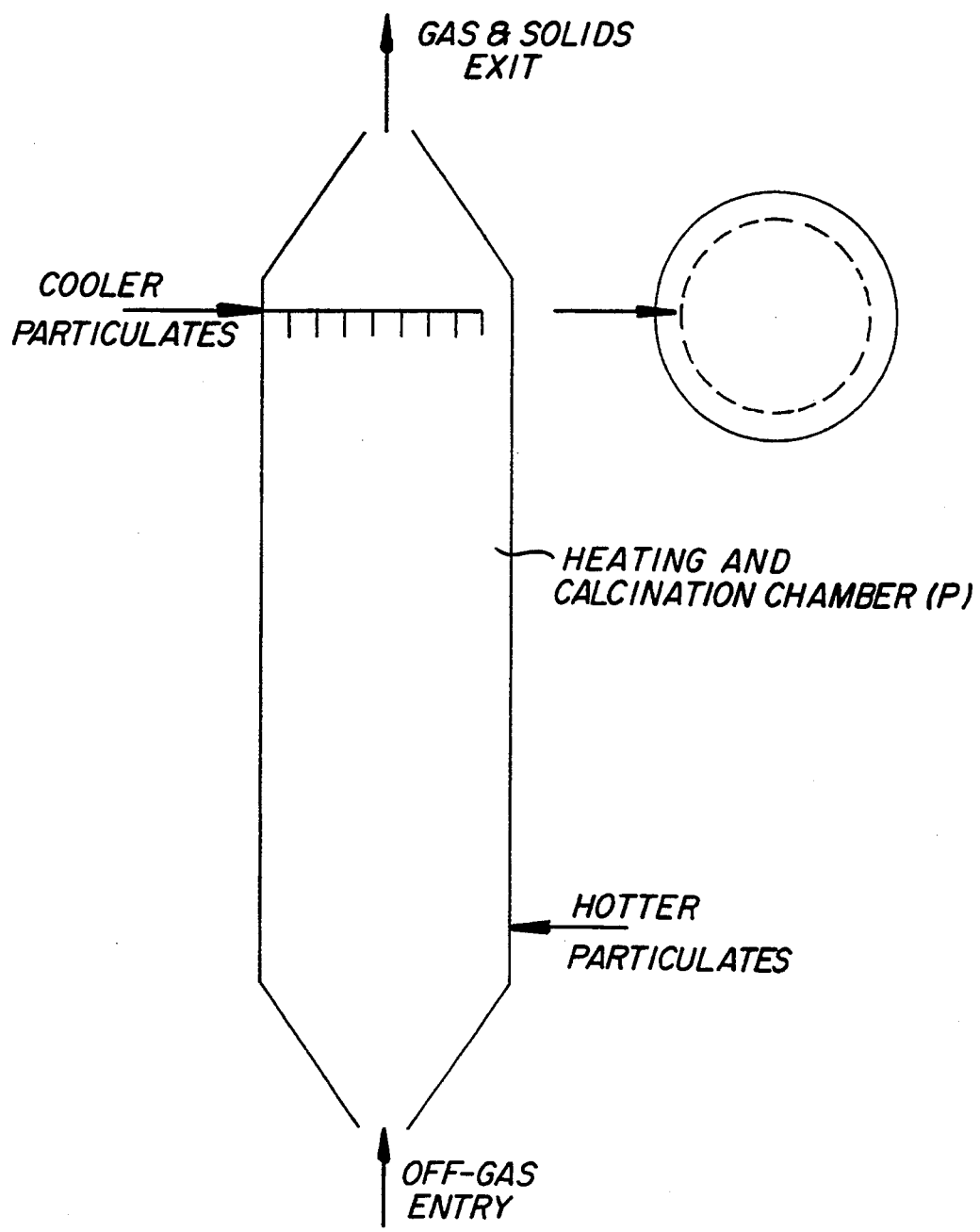
FIG. 4 illustrates another embodiment of the invention. In this embodiment, cooler particulate material is introduced into the chamber near the chamber exit but in proximity to the chamber walls, so as to provide a falling curtain of cooler particles adjacent to the interior surface. These cooler particles, as they fall towards the off-gas entry nozzle of the chamber become entrained in the flow of off-gas, and leave the chamber through the gas and solids exit port.

With reference to FIG. 4, the operation of this embodiment, in which protection for the interior surface of chamber M is enhanced by a falling outer curtain of cooler particles, has been described above.

It will be clearly understood that the invention in its general aspects is not limited to the specific details referred to hereinabove.

We claim:

1. A process for heating a solid non-reducible particulate material with a hot gas containing sticky particulate material which process comprises forming a stream of the solid non-reducible particulate material and the hot gas containing sticky particulate material, wherein the hot gas has a temperature in excess of that at which the sticky particulate material contained in the hot gas exhibits sticky characteristics.

2. A process according to claim 1 wherein the solid non-reducible particulate material is heated to a temperature in excess of that at which the sticky particulate material contained in the hot gas exhibits sticky characteristics and is thereafter quenched to a temperature below that at which the sticky particulate material exhibits sticky characteristics.

3. A process according to claim 1 wherein the stream is formed in a chamber and the process further comprises the steps of causing particles in the stream to enter flow patterns in which inter-particle contact is minimized and sticky particles are cooled below their sticky temperature before contacting internal walls of the chamber.

4. A process according to claim 3 wherein the particles are caused to enter the desired flow patterns by progressively reducing, the velocity of the stream as it travels through the chamber from a first end towards a second end thereof and then causing the velocity of the stream to increase as the second end is approached.

5. A process according to claim 1 wherein the hot gas is an off-gas from a molten bath reactor.

6. A process according to claim 1 wherein the solid non-reducible particulate material is capable of being calcined when heated.

7. A process according to claim 1 wherein the solid non-reducible particulate material is a carbonate.

8. A process according to claim 7 wherein the carbonate is limestone.

9. A process according to claim 7 wherein the carbonate is dolomite.

10. A process according to claim 1 comprising the additional steps of entraining the solid non-reducible particulate material in a carrier gas to form a stream of entrained solid non-reducible particulate material and causing the stream of entrained solid non-reducible particulate material to mix with a stream of the hot gas to form the stream of solid non-reducible particulate material and hot gas.

11. A process according to claim 10 wherein a degree of swirl is imparted to the stream of solid non-reducible particulate material and hot gas by the stream of entrained solid non-reducible particulate material.

12. A process according to claim 10 wherein the solid non-reducible particulate material is heated to a temperature controlled by controlling the flow rate of hot gas, carrier gas or both.

13. A process according to claim 1 comprising the additional step of injecting am oxygen containing gas into the hot gas to burn any combustible material in the got gas to provide additional heat.

14. A process according to claim 1 wherein the temperature of the hot gas lies in the range from 1100 to 1800 C.

15. A process according to claim 4 comprising the additional step of causing a circumferential curtain of cool solid non-reducible particulate material to fall from the second end of the chamber towards the first end thereof to prevent hot sticky particles from hitting the internal wall of the chamber.

16. A chamber for heating a solid non-reducible particulate material which chamber comprises a vessel adapted to confine and direct a stream of non-reducible particulate material and a hot gas;
first inlet means for introducing the hot gas into the vessel;
second inlet means for introducing into the vessel a stream of solid non-reducible particulate material entrained in a carrier gas;
outlet means for the stream of heated solid non-reducible particulate material
wherein the first and second inlet means and the outlet means are so located with respect to each other and the vessel is so shaped and sized that the solid non-reducible particulate material is initially heated and subsequently quenched prior to the stream leaving the vessel and the first inlet means and the vessel have cross-sectional areas that are so sized that the solid non-reducible particulate material enters flow patterns in which inter-particle contact and contact with vessel walls are minimized.

17. A chamber according to claim 16 wherein the vessel is elongate in the direction of flow of the stream of solid non-reducible particulate material and hot gas.

18. A chamber according to claim 17 wherein the first and second inlet means are located at a first end of the vessel and the outlet means is located at a second end of the vessel.

19. A chamber according to claim 17 wherein the first inlet means is located near the longitudinal axis of the vessel.

20. A chamber according to claim 16 wherein the vessel has a cross sectional area substantially greater than that of the first inlet means.

21. A chamber according to claim 16 wherein the first inlet means is located near the second inlet means.

22. A chamber according to claim 19 wherein the second inlet means is directed towards the longitudinal axis of the vessel.

23. A chamber according to claim 19 wherein the second inlet means is so directed that it imparts a radial component and a tangential component to the direction of the stream of solid non-reducible particulate material and carrier gas introduced into the vessel therethrough.

24. Apparatus comprising;
a molten bath reactor;
a chamber according to claim 16;
means for passing off-gas from the molten bath reactor to the chamber and means for passing heated solid non-reducible particulate material from the chamber to the molten bath reactor.

* * * * *